United States Patent [19]

Murakami

[11] Patent Number: 5,301,017
[45] Date of Patent: Apr. 5, 1994

[54] APPARATUS FOR RECEIVING AND DISPLAYING COLOR TELEVISION SIGNALS HAVING DIFFERENT FORMATS

[75] Inventor: Seiji Murakami, Tokyo, Japan

[73] Assignee: Kabushiki Kaisha Toshiba, Kanagawa, Japan

[21] Appl. No.: 104,553

[22] Filed: Aug. 11, 1993

[30] Foreign Application Priority Data

Aug. 28, 1992 [JP] Japan .................................. 4-230367

[51] Int. Cl.⁵ .......................... H04N 9/69; H04N 9/31; H04N 9/535
[52] U.S. Cl. .................................... 348/645; 348/708; 348/625; 348/751
[58] Field of Search ....................... 358/27, 28, 29, 36, 358/37, 21 R, 32, 40, 10, 65, 60; H04N 9/535, 5/46, 9/31, 9/69, 9/73

[56] References Cited

U.S. PATENT DOCUMENTS

| | | | |
|---|---|---|---|
| 4,167,750 | 9/1979 | Tomimoto et al. | 358/27 |
| 4,553,157 | 11/1985 | Hurst, Jr. et al. | 358/27 |
| 5,132,793 | 7/1992 | Hirahata et al. | 358/11 |
| 5,208,661 | 5/1993 | Jaspers | 358/27 |

FOREIGN PATENT DOCUMENTS 23478  5/1982  Japan ........................... H04N 9/535

Primary Examiner—James J. Groody
Assistant Examiner—Glenton B. Burgess
Attorney, Agent, or Firm—Banner, Birch, McKie & Beckett

[57] ABSTRACT

A projection-type display apparatus having a lamp which emits a high intensity white light, two dichroic mirrors which filter out the three primary color beams from the white light and three liquid crystal panels which, respectively, modulate the color beams according to the three color image signals. Characteristics of the lamp and the dichroic mirrors are set so that the reproduction chromaticity range includes transmission chromaticity ranges of both the NTSC and HDTV systems. The image signals are supplied to two types of linear matrix circuit which are, respectively, suited for the NTSC and HDTV systems in order to correct color reproduction errors. The output of the linear matrix circuits are selected according to the system of the received television signal. In addition, a display white color temperature is set in the corrected image signals according to the system. Thus, the image signals are supplied to a display device such that the colors of the image can be accurately reproduced.

12 Claims, 9 Drawing Sheets

APPARATUS FOR RECEIVING AND DISPLAYING COLOR TELEVISION SIGNALS HAVING DIFFERENT FORMATS

FIELD OF THE INVENTION

The present invention generally relates to the color television field, and more particularly, is directed to a color television receiver which is capable of receiving and displaying color television signals broadcast with different transmission specifications and formats. The receiver permits accurate reproduction and display of the color picture information contained in the received television signal without regard to its transmission specification or format.

BACKGROUND OF THE INVENTION

In the NTSC television signal system, which is the system presently in use in the United States and in many other countries, the transmission specifications and format were established in order to maximize the amount of red (R), green (G) and blue (B) primary color information which can be transmitted in the television signal. Thus, the NTSC specifications and format provide wide chromaticity ranges in order to insure transmission of full color content for the television image.

Television receivers known in the prior art reproduce the color image contained in the television signal by adding and mixing the red, green, and blue primary color information extracted from the television signal. However, the chromaticity ranges of a typical television receiver is narrower than the chromaticity ranges present in the received television signal. Thus, full and faithful reproduction of the color picture information contained in the television signal is not possible in television receivers known in the prior art.

FIG. 1 is a CIE (Commission International de Enluminure) chromaticity diagram illustrating the red, green and blue primary color chromaticity values for the NTSC system, the phosphor in a cathode ray tube (CRT) used in the typical television receiver and the color filter in a liquid crystal display device (LCD), also now commonly used in small portable television receivers and large projection-type television displays. The NTSC chromaticity values are represented by the dashed line, the CRT chromaticity values are represented by the dot-dash line and the LCD values are represented by the solid line. The chromaticity values charted in FIG. 1 are set forth below in table form:

|    | NTSC  |       | CRT   |       | LCD   |       |
|----|-------|-------|-------|-------|-------|-------|
|    | X     | Y     | X     | Y     | X     | Y     |
| R: | 0.670 | 0.330 | 0.657 | 0.338 | 0.613 | 0.334 |
| G: | 0.210 | 0.710 | 0.297 | 0.609 | 0.283 | 0.627 |
| B: | 0.140 | 0.080 | 0.148 | 0.054 | 0.140 | 0.079 |

The outer bold line in FIG. 1, and associated numbers at the indicated points on the line, illustrate the spectrum locus and wave-lengths (nm). In the NTSC system here, C light having a color temperature of 6774 K is used as a reference white light W with the following chromaticity:

W:X=0.3101, Y=0.3163

In the NTSC system, if the chromaticity values for the three primary colors for the display (CRT or LCD) in the receiver are set to the same as the NTSC values, the color picture information in the transmitted television signal can be faithfully reproduced on the receiver display by setting the reference white light to the chromaticity of C light. However, a color television receiver must also be capable of receiving and displaying black and white television signals. Therefore, in order to achieve the requisite compatibility with black and white television broadcasts, a white color light with higher chromaticity values than C light must be used as the reference.

In addition, the chromaticity values for the primary colors for a television receiver depends on the phosphor chromaticities of the CRT or LCD which, as described above and shown in FIG. 1, are different than the chromaticity values for the primary colors for the NTSC system. Therefore, if corrections are not made for the differences between the NTSC and receiver chromaticity values, color errors will result and the color picture information contained in the television signal will not be faithfully reproduced on the display in the receiver.

Moreover, and as also discussed above, the chromaticity ranges of the CRT and LCD are narrower than the NTSC chromaticity ranges. Thus, the color reproduction range of the television receiver is not broad enough to reproduce all of the color information contained in the incoming television signal. Therefore, even when the appropriate color corrections are made with respect to differences in the NTSC and display chromaticity values, the receiver is still not capable of faithful reproduction of every color received in the incoming television signal.

The types of color reproduction errors discussed above are also referenced on page 959 in the book entitled "The New Color Science Handbook" which was published in Japan.

FIG. 2 is a UV chromaticity diagram showing the color reproduction errors described above and referenced in the above mentioned handbook. The solid line triangle in FIG. 2 indicates the chromaticity range for the primary colors of the NTSC system on the transmission side of the television signal. The dashed line triangle illustrates the chromaticity range of the primary colors of the CRT phosphor at the receiver. Note that while the NTSC and CRT ranges greatly overlap, the NTSC range is slightly larger and each of its values are shifted from the corresponding values in the CRT range. The graph in FIG. 2 is obtained by calculating the color reproduction error based on the differences between the NTSC and CRT chromaticity ranges. An example of some of the NTSC chromaticity values are shown by the dots in FIG. 2. In order to correct color reproduction errors in the display, these values must be shifted in order to bring them into a corresponding point in the CRT chromaticity range as indicated by the arrows in FIG. 2.

In CRT television receivers and color cameras, linear matrix circuits are used to correct color reproduction errors. FIG. 3 is a block diagram showing a linear matrix circuit which corrects such color reproduction errors. The G (green), B (blue) and R (red) primary color signals are supplied to input terminals 1, 2 and 3, respectively, and to gamma cancellation circuits 4, 5 and 6 so that transmission gamma is cancelled by removing the gamma correction which was added to the signal on the image transmission side.

The output signals from gamma cancellation circuits 4, 5 and 6 are supplied to matrix circuit 7 which is formed of coefficient circuits 8 to 16 and adders 17 to 19. Matrix circuit 7 multiplies the supplied R, G and B signals by respective correction matrix coefficients and then adds them together. Coefficient circuits 8 to 16 can be formed of simple circuits using resisters as is known in the art. Gamma addition circuits 20, 21 and 22 add the transmission gamma to the respective corrected R, G and B color signals and outputs them via terminals 23, 24 and 25 as primary color signals $R^1$, $G^1$, and $B^1$. In this way, color reproduction errors are removed and approximately the same colors as in the transmitted image can be reproduced at the receiver. However, the correction is possible only for colors in the region in which the solid line triangle and the dashed line triangle in FIG. 2 overlap each other.

Recently, there have been test broadcasts of a high definition television (HDTV) signal format which is capable of displaying high quality television images. Taking into account the popularity of the existing NTSC television system, and the large installed base of such equipment, television receivers which are capable of receiving images in both the NTSC and HDTV system formats are being made commercially available. However, the transmission specifications of an HDTV system are different from those of an NTSC system. In the HDTV transmission specification and format, the R, G and B primary color chromaticities are as follows:

| | | |
|---|---|---|
| R: | X = 0.640, | Y = 0.330 |
| G: | X = 0.300, | Y = 0.600 |
| B: | X = 0.150, | Y = 0.060 |

Also in the HDTV specification, $D_{65}$ light is used as a reference white color and its chromaticity W is as follows:

W:X=0.3127, Y=0.3290

FIG. 4 is a CIE chromaticity diagram showing the NTSC specification values and the HDTV specification vales of the respective R, G and B primary color chromaticities. As FIG. 4 indicates, the chromaticity value for G in the NTSC system is greatly different than the chromaticity value for G in the HDTV system. Note, however, that the chromaticity value for G in the HDTV system is comparatively close to the chromaticity value for G in CRT and LCD displays (see FIG. 1). Therefore, in a television receiver which uses a CRT or LCD, there is comparatively little color reproduction error when receiving and displaying a HDTV broadcast. There is, however, a likelihood of large color reproduction errors when receiving an NTSC broadcast as is apparent from FIG. 1.

When correcting color reproduction errors for one system in a television receiver which is capable of receiving multiple system formats (such NTSC and HDTV) in which the three primary color chromaticity values differ from one system to the other, color reproduction errors in the other systems cannot be corrected.

Television programs produced by the HDTV system and commercial feature films are sometimes broadcasted using the NTSC system. Feature films usually are produced in accordance with specifications established by the Society of Motion Picture and Television Engineers (SMPTE). The HDTV system also is set to conform to SMPTE specifications.

FIG. 5 is a CIE chromaticity diagram showing the transmission primary color chromaticity values for both the SMPTE and NTSC systems. As is apparent from FIGS. 4 and 5, the transmission primary color chromaticity values for the HDTV system approximately coincides with those of the SMPTE system. Also, the PAL and SECAM television signal transmission systems are nearly standardized to the EBU specifications. The transmission primary color chromaticity values for these systems also approximately coincide with those of the HDTV system There is presently known in the art an HDTV to NTSC system converter which enables reception of HDTV broadcasts on a standard NTSC system television receiver. With such a converter, or other equipment having similar functions as that of the converter, it is possible to also convert other signal formats, such as SMPTE, PAL and SECAM to NTSC for display on a standard NTSC receiver. However, the transmission gamma of the NTSC system differs from the transmission gamma of any one of the other systems.

FIG. 6 is a graph illustrating transmission gamma. The solid line shows the gamma curve of the SMPTE system and the dashed line shows the gamma curve of the NTSC system ($\gamma=0.45$). As shown in FIG. 6, the black side values in particular differ between the NTSC and the SMPTE systems. Due to the difference between the gamma curves, the rendering of the black gradations sometimes is unnatural depending on the signal source of the broadcast program. For instance, even within the same broadcast program, the gradation rendering differs according to the difference in the signal source, namely in accordance with the specification under which the program was produced.

In addition to television receivers which use a CRT or liquid crystal display, recently projection-type color television receivers have been developed in order to provide large-screen viewing. Projection-type television receivers uses a plurality of liquid crystal panels capable of modulating light colors. Such a receiver is referred to at pages 415 to 418 in "SID 91 DIGEST."

SUMMARY OF THE INVENTION

In accordance with this invention, a television apparatus is provided for displaying an image transmitted in accordance with a plurality of different transmission specifications and formats. The apparatus includes a color correction device for correcting color reproduction errors associated with the received television signal. The reproduction errors are due to differences in the primary color chromaticity values between the transmission side and the reception side of the television signal. The errors must be corrected in order to provide faithful reproduction of the color picture information contained in the television signal for display at the receiver.

A control device also is provided for controlling the operation of the error correction device in accordance with the particular specification and format of the received signal. The corrected primary color information is provided to a display for display of the television image with full and accurate color reproduction. The displayed image has reproduction chromaticity ranges which are sufficiently broad to include essentially all of the transmission chromaticity ranges of the various transmission systems such as NTSC, HDTV, SMPTE and the like.

It is therefore an object of the present invention to provide a television apparatus by which the colors on the transmission side of the system can be faithfully reproduced even when receiving a television signal from multiple systems with differing transmission specifications and formats.

Another object of the present invention is to provide a display apparatus which can provide natural gradation rendering when using different television system specifications and formats.

The above and other objects of the present invention will become obvious upon an understanding of the illustrative embodiments described below. Various advantages which are not referred to herein will also occur to those skilled in the art upon employment of the present invention in practice.

DETAILED DESCRIPTION OF THE PREFERRED EMBODIMENT

Representative embodiments of the present invention will now be explained with reference to the accompanying drawings.

Figure 7:
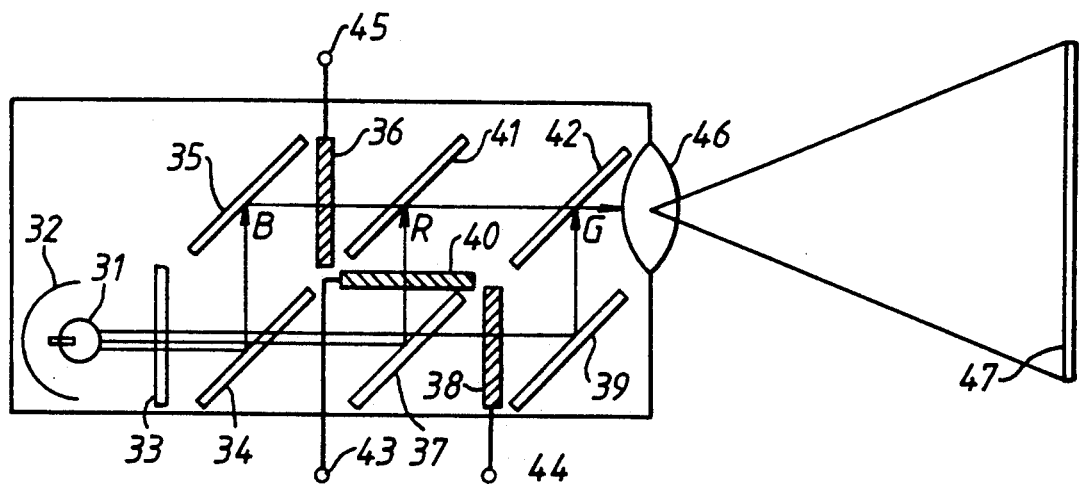
FIG. 7 is a schematic block diagram showing a projection-type color television receiver to which an embodiment of the present invention is applied.

FIG. 7 is a line drawing illustrating a projection-type color television receiver to which an embodiment of the present invention can be applied. In this embodiment, the projection type television receiver shown in FIG. 7 is capable of receiving and displaying television picture information in both the NTSC and HDTV formats.

The receiver of FIG. 7 operates in the following manner. A white lamp 31 emits a high intensity white light. A metal halide lamp which has superior color rendering can be used for white lamp 31. A reflector 32 is provided on the periphery of white lamp 31 and is the focal point of the white light. The reflecting surface of reflector 32 is formed in the shape of a paraboloid so that the light from white lamp 31 is reflected and directed in a parallel beam in a direction perpendicular to the reflecting surface of reflector 32.

A UV-IR filter 33 is positioned in front of white lamp 31. This filter eliminates unwanted light from the beam reflected from reflector 32. The reflected beam which passes through filter 33 is incident upon dichroic mirror 34. Dichroic mirror 34 reflects, or filters out, blue light while passing other colors of light.

A mirror 35 is positioned on the beam axis of the blue light reflected from dichroic mirror 34 and in turn reflects this light to blue light liquid crystal panel 36 which is positioned on the beam axis of the light reflected from mirror 35. A dichroic mirror 37 is positioned on the beam axis of the light which passed through dichroic mirror 34, and it reflects or filters out, red light while passing green light to green light liquid crystal panel 38. The red light reflected by dichroic mirror 37 is incident upon a liquid crystal panel 40. Thus the three liquid crystal panels 40, 38 and 36 receive an R signal, a G signal and a B signal, respectively, via terminals 43, 44 and 45 from a drive circuit which will be discussed below. At the same time, liquid crystal panels 40, 38 and 34 are supplied with, and driven by, scanning signals from a drive circuit so that each colored beam is modulated and respectively emitted as an R image beam, a G image beam and a B image beam from their emission surfaces.

A synthesizing mirror 41 is positioned on both beam axis of the light emitted from liquid crystal panels 40 and 36. Mirror 41 optically synthesizes and transmits the B image beam and the R image beam from liquid crystal panels 36 and 40. A mirror 3 reflects the G image beam from liquid crystal panel 38. This reflected beam is directed to another synthesizing mirror 42. Synthesizing mirror 42 optically synthesizes the image beam from synthesizing mirror 41 and the G image beam from mirror 39 and directs them to a projection lens 46. Projection lens 46 is designed so that the incident beam is magnified and projected onto a screen 47.

Figure 8:
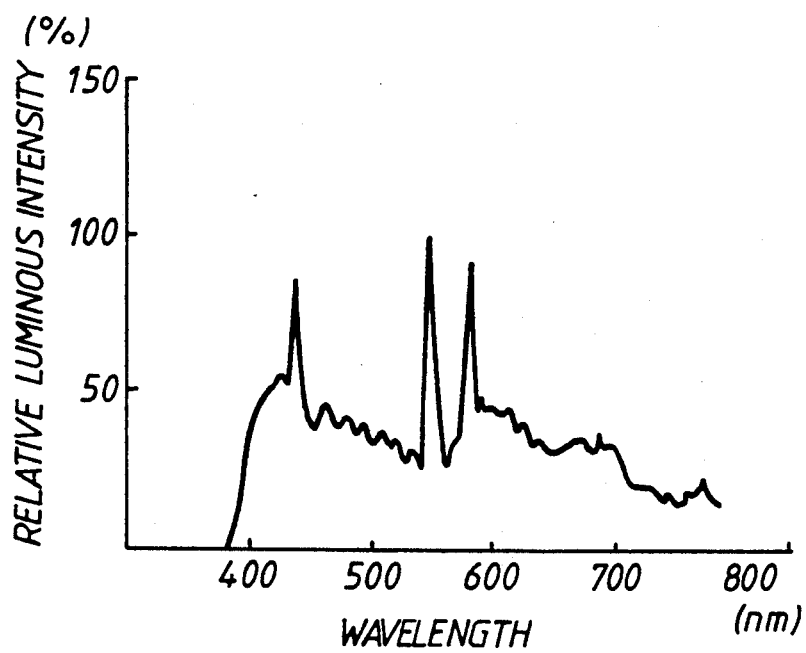
FIG. 8 is a graph showing the light emission distribution characteristics of a metal halide lamp.

FIG. 8 is a graph showing the typical light emission distribution characteristics for the metal halide lamp used for white lamp 31, where wavelength is plotted along the horizontal axis and relative luminous intensity is plotted along the vertical axis. As shown in FIG. 8, a continuous spectrum of light is emitted from white lamp 31. This continuous spectrum of light is resolved by dichroic mirrors 34 and 37 in order to obtain the three primary color beams, blue, red and green.

Figure 9:
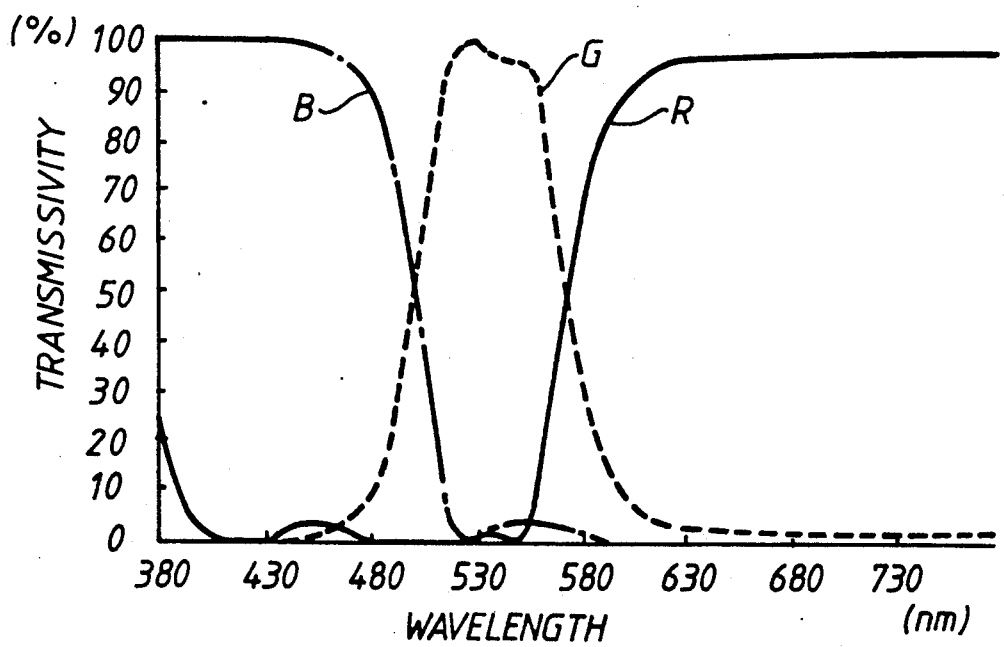
FIG. 9 is a graph showing the integrated transmissivity characteristics of dichroic mirrors.

FIG. 9 is a graph showing the integrated transmissivity curves of dichroic mirrors 34 and 37, where wavelength is plotted along the horizontal axis and transmissivity is plotted along the vertical axis. In the graph, the dot-dash line (B), the solid line (R) and the dashed line (G) show that wavelengths in the vicinity of blue, red and green light, respectively, can be obtained.

Figure 10:
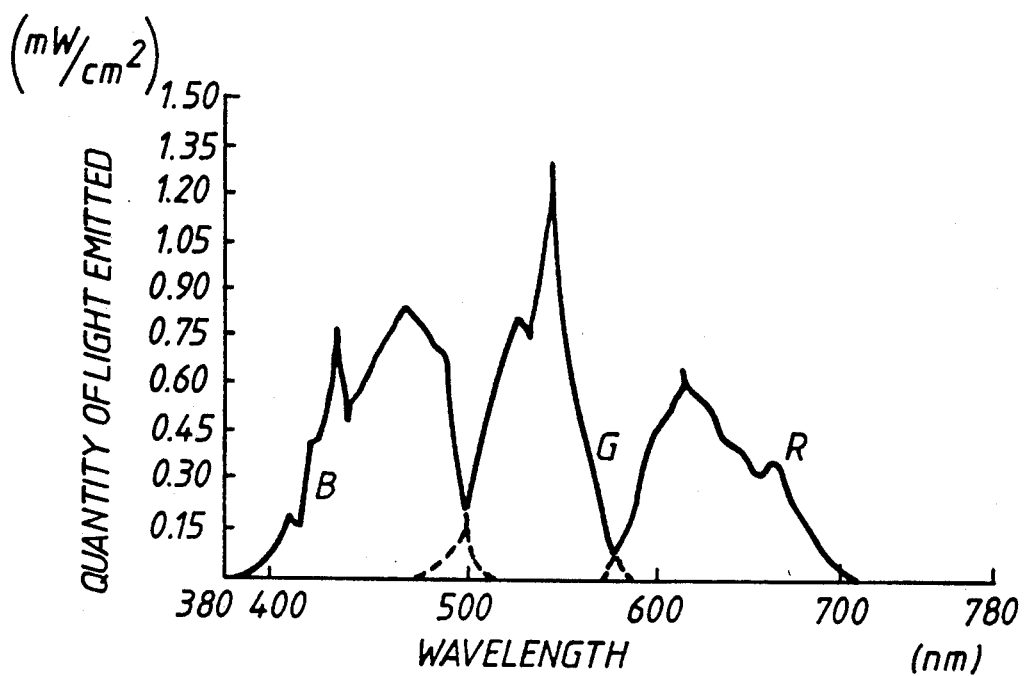
FIG. 10 is a graph showing the light output characteristics of dichroic mirrors.

FIG. 10 is a graph showing the light output curves of dichroic mirrors 34 and 37, where wavelength is plotted along the horizontal axis and quantity of light emitted is plotted along the vertical axis.

The light from white lamp 31 is split into the three primary colors having the characteristics shown in FIG. 10 by passing the light through dichroic mirrors 34 and 37 as discussed above. When liquid crystal panels 36, 38 and 40 are in the transmission state, image beams with the same characteristics as shown in FIG. 10 are emitted. Thus, display of the three primary color chromaticities are determined by the light-emitting characteristics of white lamp 31 and the transmissivity characteristics of the optical components of dichroic mirrors 34 and 37. Display of the three primary color chromaticities also vary due to the optical component characteristics of UV-IR filter 33, projection lens 46 and mirrors 35, 39, 41 and 42. However, variations due to these components are small and are not dominant factors.

Control of the display of the three primary color chromaticity values can be accomplished relatively easily by suitably setting the transmissivity characteristics of dichroic mirrors 34 and 37. For example, when it is desired to project a color on the spectrum locus in a CIE chromaticity diagram, a dichroic mirror having narrow band filter characteristics and which only transmits light of that wavelength is used. In this embodiment, the light-emitting characteristics of white lamp 31, and the transmissivity characteristics of dichroic mirrors 34 and 37, are set for the reproduction range of the three primary color chromaticity values for both the NTSC and HDTV systems.

Figure 11:
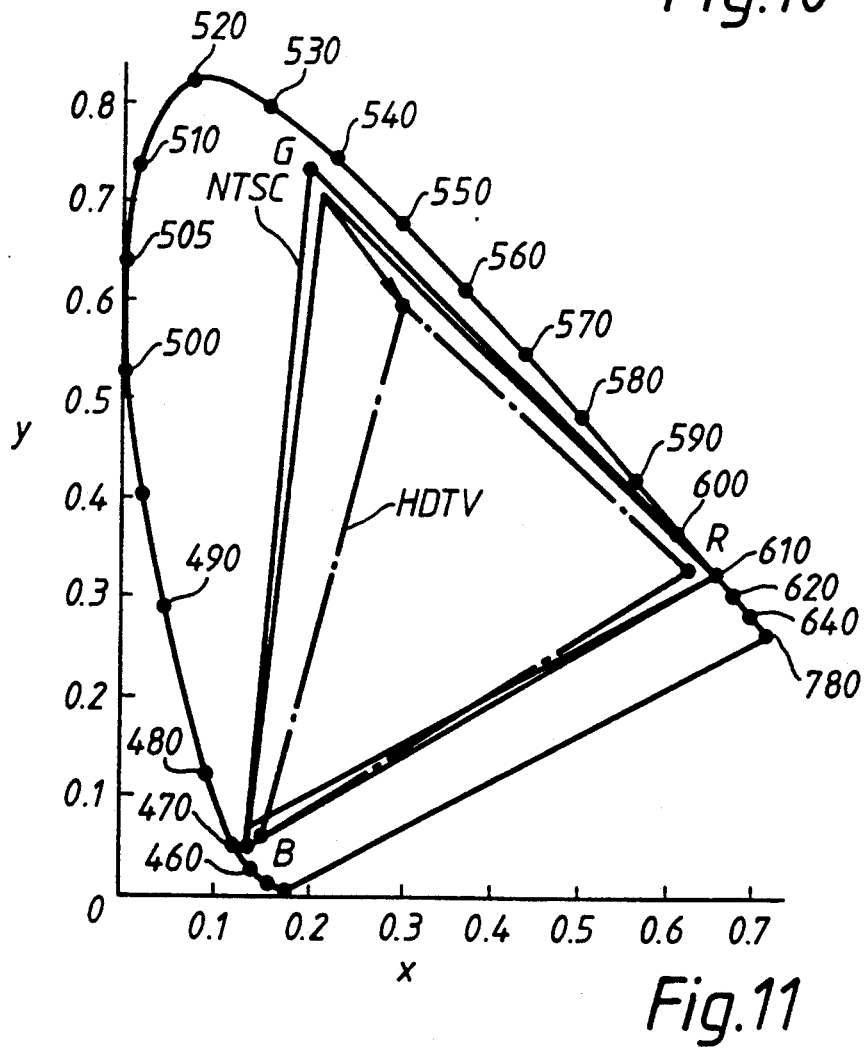
FIG. 11 is a CIE chromaticity diagram showing the three primary color chromaticities of a television receiver in accordance with one embodiment of the present invention.

FIG. 11 is a CIE chromaticity diagram showing the chromaticity values for displaying the three primary color chromaticities which are established by setting the optical system illustrated in FIG. 7 so that the color reproduction range is set to the chromaticity range shown by the thick-line triangle, i.e., the range which includes the NTSC and HDTV formats.

Figure 1:
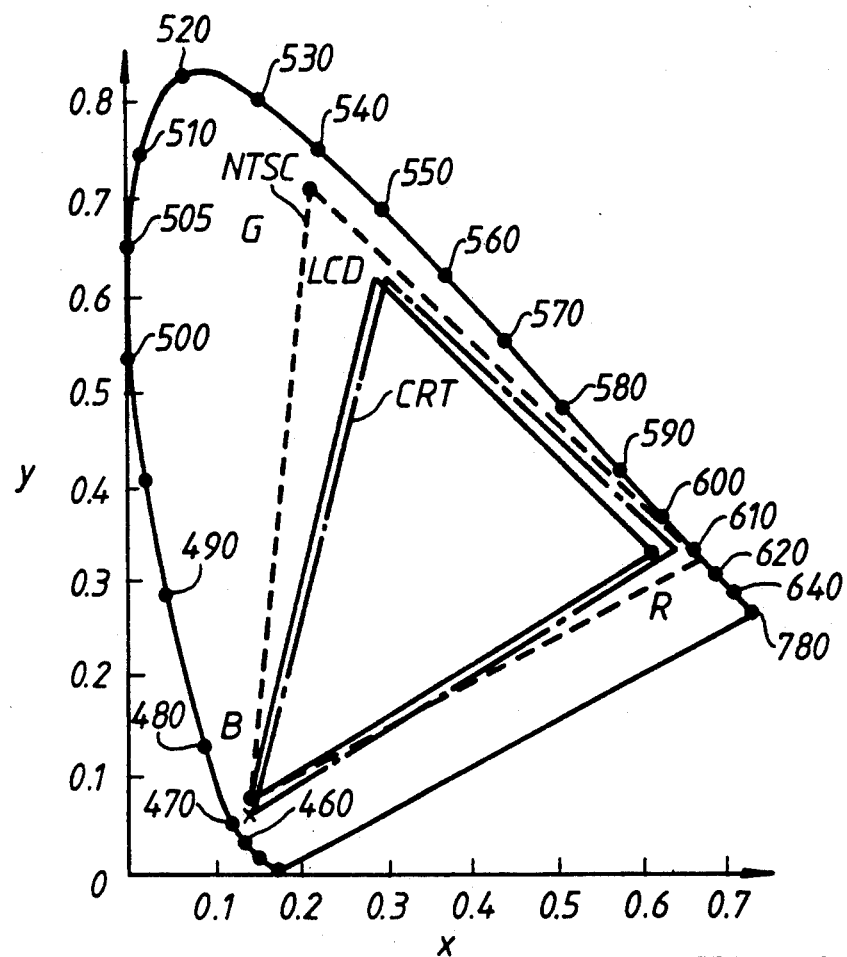
FIG. 1 is a CIE chromaticity diagram showing the three primary color chromaticities of an NTSC system, a CRT phosphor display screen and an LCD display screen.
Figure 2:
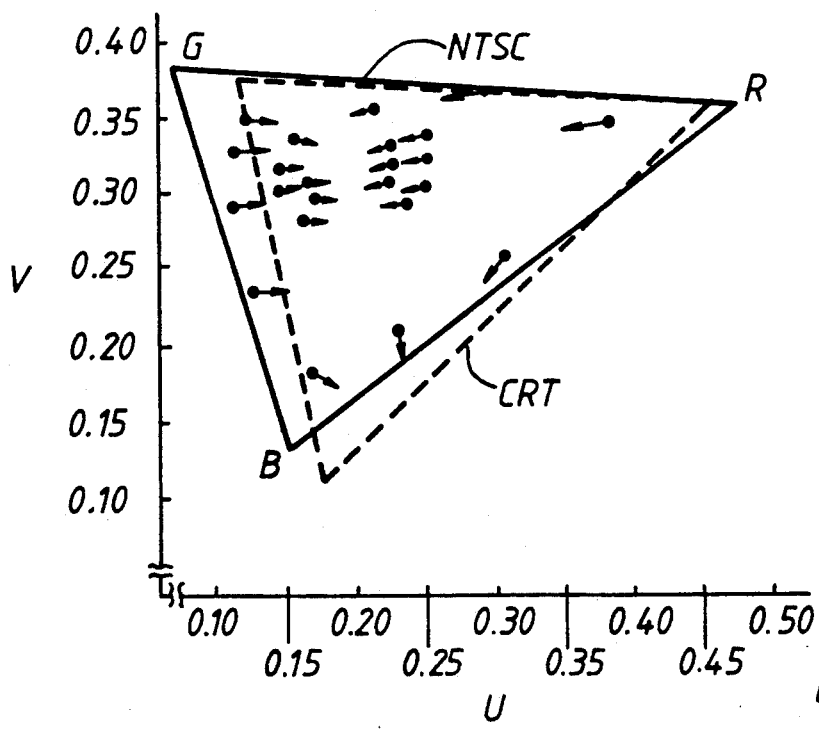
FIG. 2 is a UV chromaticity diagram showing color reproduction errors.
Figure 3:
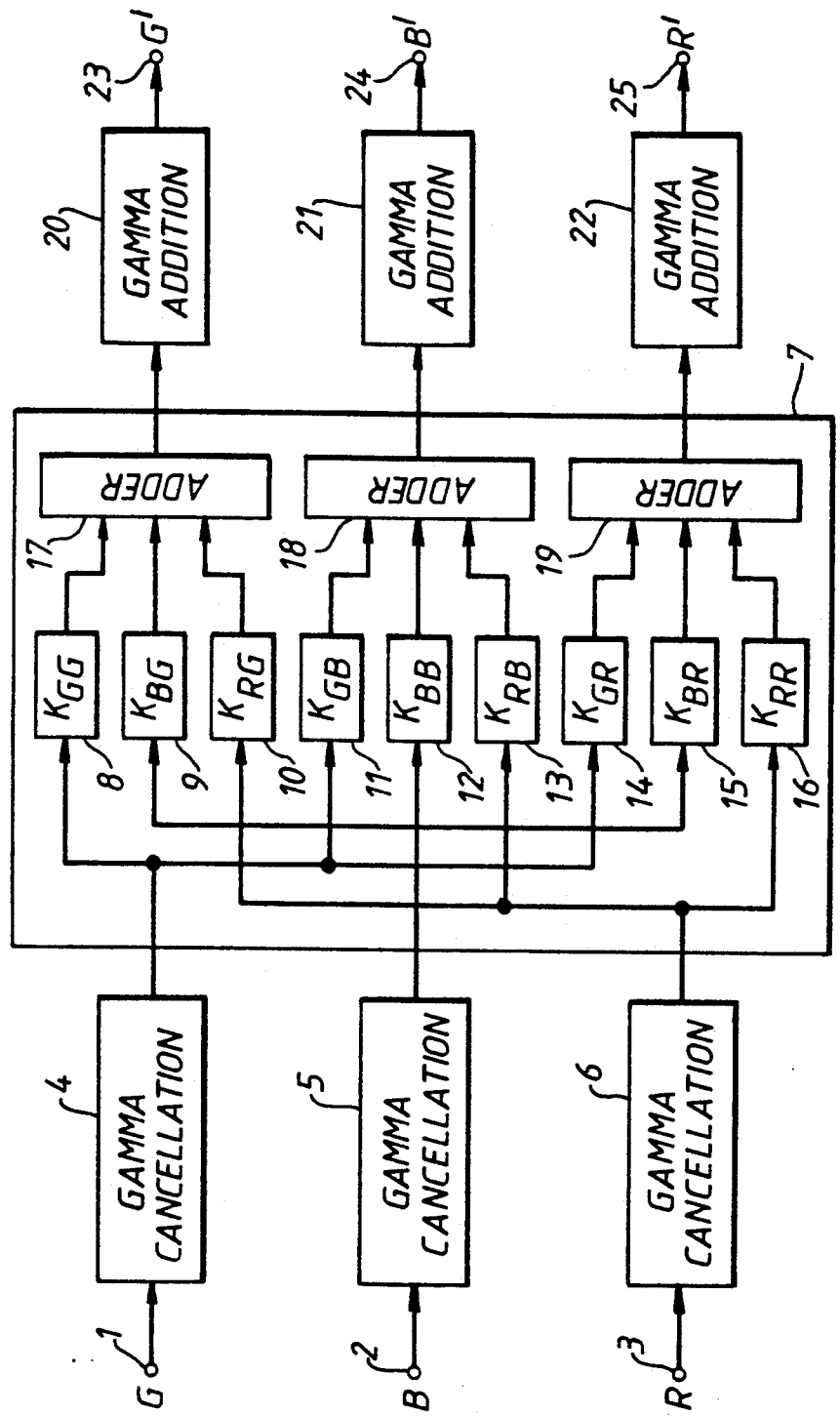
FIG. 3 is a block diagram illustrating a linear matrix circuit which corrects color reproduction errors.
Figure 12:
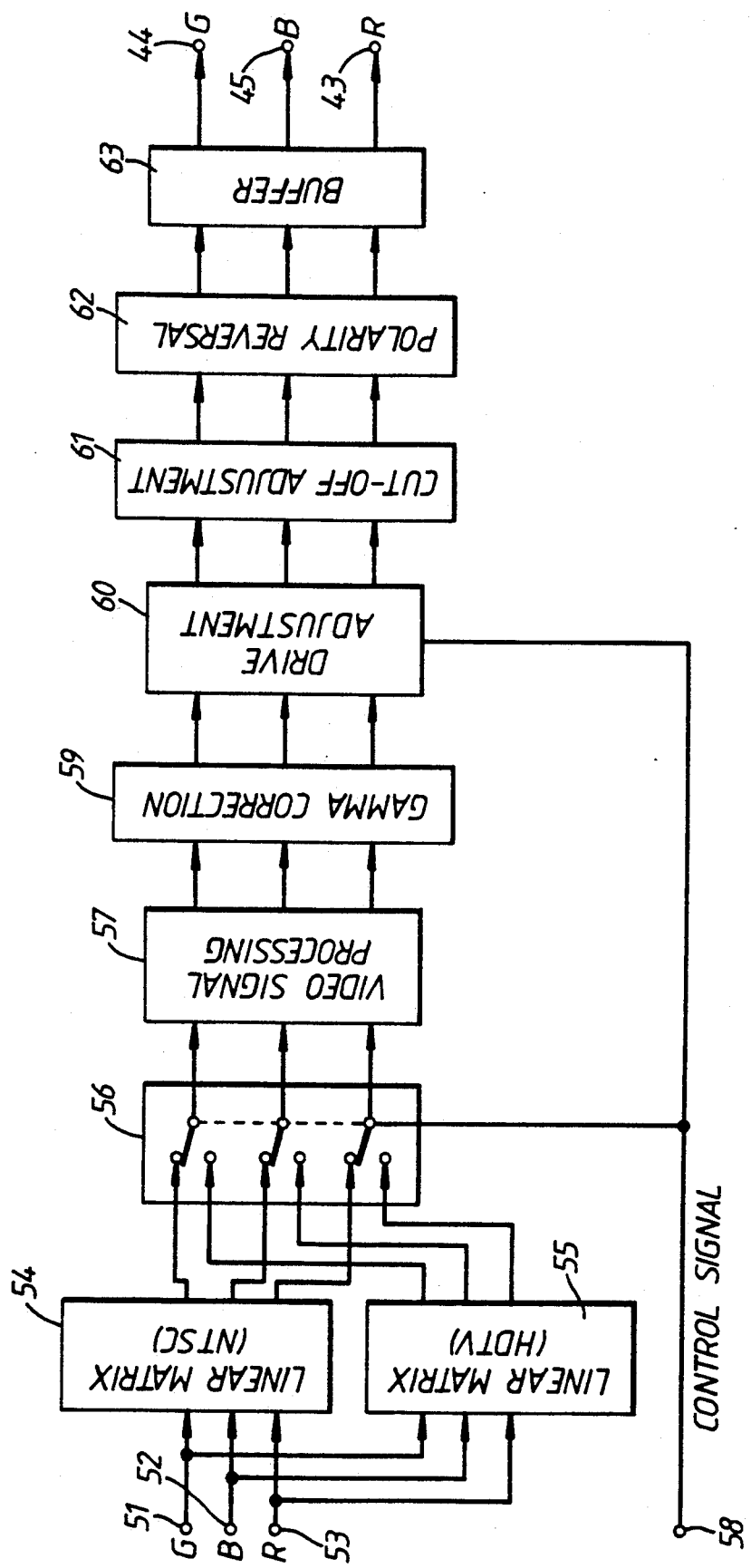
FIG. 12 is a block diagram showing the drive circuitry used for driving the liquid crystal panels shown in FIG. 7 according to one embodiment of the present invention.

FIG. 12 is a block diagram showing the drive circuitry which supplies the R, G and B image signals to terminals 43, 44 and 45 in FIG. 7. As shown in FIG. 12, respective R, G and B original image color signals are supplied to input terminals 51, 52 and 53 and in turn, to linear matrix circuits 54 and 55. Matrix circuits 54 and 55 differ from the matrix circuit in FIG. 3 only with respect to the correction matrix coefficients in coefficient circuits 8 to 16 and the characteristics of gamma addition circuits 20 to 22. In other words, linear matrix circuit 54 sets the correction matrix coefficients so that the three display primary color chromaticities agree with the three transmission primary color chromaticities of an NTSC system. Linear matrix circuit 55 also sets the correction matrix coefficients so that the three display primary color chromaticities agree with the three transmission primary color chromaticities of the HDTV system.

A switching circuit 56 is controlled by a control signal from terminal 58. Circuit 56 selects either the R, G and B signals from linear matrix circuit 54, or the R, G and B signals from linear matrix circuit 55, and outputs them to a video signal processing circuit 57. The control signal supplied to terminal 58 indicates whether the received signal is an NTSC or HDTV format signal. When receiving an NTSC format signal, switching circuit 56 selects linear matrix circuit 54 and when receiving an HDTV format signal, switching circuit 56 selects linear matrix circuit 55.

Video signal processing circuit 57 performs contrast adjustment, brightness adjustment and picture quality correction and outputs processed signals to gamma correction circuit 59. Transmission gamma is originally added to the television signal on the transmission side by taking in account the voltage/brightness characteristics of the CRT. Therefore, gamma correction circuit 59 performs gamma correction which takes into consideration the reverse correction of transmission gamma and the transmissivity characteristics of liquid crystal panels 36, 38 and 40.

The gamma addition circuits of linear matrix circuits 54 and 55 of the present embodiment are designed to add a transmission gamma which is the specification value of one of the broadcast systems. The transmission gamma which conforms to the HDTV specification and format is added in the present embodiment independently of the format of the received signal. By this process, fluctuations in the graduation rendering of the black side due to the system can be prevented.

Gamma correction circuit 59 may be omitted by correcting the transmissivity characteristics of the liquid crystal panels using the gamma addition circuits in linear matrix circuits 54 and 55. In addition, the gamma addition circuits may be omitted by adding transmission gamma using gamma correction circuit 59 for correcting the transmissivity characteristics of the liquid crystal panels.

The output signal from gamma correction circuit 59 is supplied to drive adjustment circuit 60. The output signal from drive adjustment circuit 60 is supplied to cut-off adjustment circuit 61. Circuits 60 and 61 perform white balance adjustment of the black and white sides of the displayed image. Drive adjustment circuit 60 is designed to alter the display white color temperature in accordance with the control signal received from terminal 58. For instance, drive adjustment circuit 60 alters the ratios between the R, G and B signals by fixing the gain of the G signal and adjusting the gains of the B and R signals. By this process, drive adjustment circuit 60 controls the display white color temperature.

In this embodiment, drive adjustment circuit 60 sets the white color temperature to C light (6774 K) when it is indicated by the control signal that an NTSC broadcast is being received. Drive adjustment circuit 60 sets the white color temperature to $D_{65}$ light (6504 K) when it is indicated that an HDTV broadcast is being received.

The output signal from cut-off adjustment circuit 61 is supplied to polarity reversal circuit 62. Circuit 62 converts the R, G and B signals to alternating signals in order to drive the liquid crystal panels. The output signals from polarity reversal circuit 62 are supplied to terminals 43, 44 and 45 via buffer circuit 63 and then to the liquid crystal panels 40, 38 and 36, shown in FIG. 7, as the R, G and B signals for modulating the colored beams, respectively.

Figure 13:
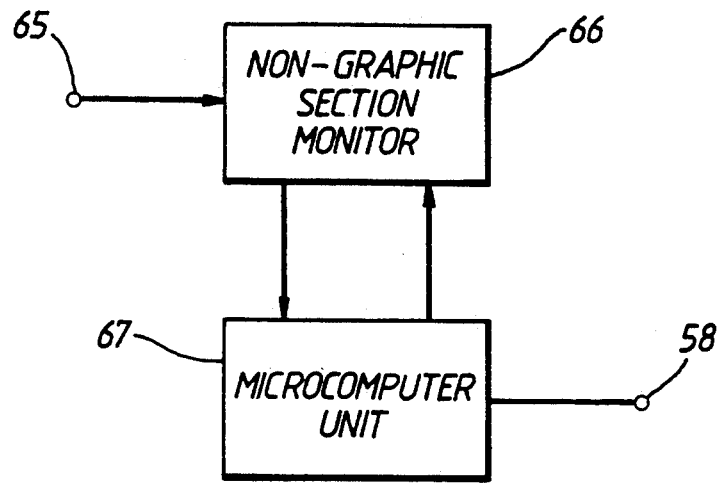
FIG. 13 is a block diagram showing the circuitry which generates control signals in accordance with the present invention.

FIG. 13 is a block diagram showing the circuitry which generates the control signal supplied to terminal 58 in FIG. 12. Since the aspect ratio of the display in an HDTV system is 16:9, the entire HDTV image cannot be displayed on the full screen area of an NTSC system display unit without distortion due its much small aspect ration of 3:4. For this reason, a letter-box display is quite often adopted in this situation which renders the top and bottom of the screen non-graphic or unusable for the display of picture information.

Figure 14:
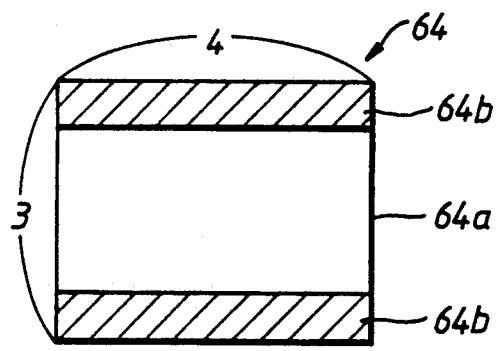
FIG. 14 is an illustration of a display screen showing a letter-box display.

Such a letter-box display is illustrated in FIG. 14. The image of the HDTV system is displayed in a center section 64a of screen 64. The non-graphic section 64b is monitored in order to detect whether a received television signal is in an NTSC format or an HDTV format. The image signal on input terminal 65 is supplied to non-graphic section monitor circuit 66. A microcomputer unit 67 supplies a search signal to monitor circuit 66 during a specified scanning line period before and after each vertical blanking period. Monitor circuit 66 monitors whether there is an image signal during the time of the search signal. As a result, microcomputer unit 67 outputs a control signal to terminal 58 which indicates an NTSC system when an image signal exists during the time of the search signal and indicates an HDTV system when no image signal exist during the time of the search signal.

The operation of this embodiment will now be explained. The chromaticity ranges of the color beams which are incident upon liquid crystal panels 36, 38 and 40 in FIG. 7 are those shown by the thick line in FIG. 11 by suitably setting the characteristics of white lamp 31 and dichroic mirrors 34 and 37. Thus, every color of the transmission specification of the NTSC and HDTV systems can faithfully be reproduced. The R, G and B signals are supplied to liquid crystal panels 40, 38 and 36, respectively. By controlling the quantity of incident beam transmission based on these signals, R, G and B image beams are emitted from the liquid crystal panels.

In the case where an NTSC television signal is received, switching circuit 56 in FIG. 12 selects the output of linear matrix circuit 54. Linear matrix circuit 54 corrects the R, G and B original signals by using the correction matrix coefficients according to the NTSC system. In addition, drive adjustment circuit 60 sets the display white color temperature to C light. By using this process, the R, G and B signals are corrected for color reproduction errors and are supplied to liquid crystal panels 40, 38 and 36.

When an HDTV television signal is received, switching circuit 56 selects the output of linear matrix circuit 55. The R, G and B signals are corrected by using the correction matrix coefficients according to the HDTV system and are supplied to video signal display white color temperature to $D_{65}$ light. As a result, when an image signal of either an NTSC or an HDTV system is received, color reproduction errors are accurately corrected by correcting the display primary color chromaticities as shown by the arrow in FIG. 11 and also by changing the display white color temperature. Moreover, and as described above, since the chromaticity ranges of the color beams incident upon liquid crystal panels 36, 38 and 40 are wider than that of either system specification, the color of the transmission side of the signal can be correctly reproduced. In addition, the gamma addition circuits of linear matrix circuits 54 and 55 add transmission gamma for the appropriate system. Therefore, regardless of the transmission system used, the same gradation rendering can be obtained and the unnaturalness of the block side gradation rendering can be improved.

In accordance with this embodiment, a projection-type television system is used and its reproduction chromaticity ranges are made much broader than those of the transmission specification and format of either an NTSC or an HDTV system by suitably setting its optical system. Color reproduction errors are corrected by using the appropriate correction matrix coefficients and display white color temperature according to the system used by the received television signal. As a result, the transmitted colors can be correctly reproduced on the receiver display.

In the case of converting a HDTV, SMPTE, PAL or SECAM broadcast signal to an NTSC signal and displaying the converted signal on an NTSC receiver, good color reproduction can be obtained by correcting the color reproduction errors in the same manner as described above. In other words, even with a standard NTSC television receiver, color reproduction errors due to differences in the primary color chromaticities of the original signal can be corrected. In addition, the present invention is able to correct differences in the gamma curves of the transmitted signal. Thus, unnaturalness of the block side gradation rendering can be solved.

Figure 15:
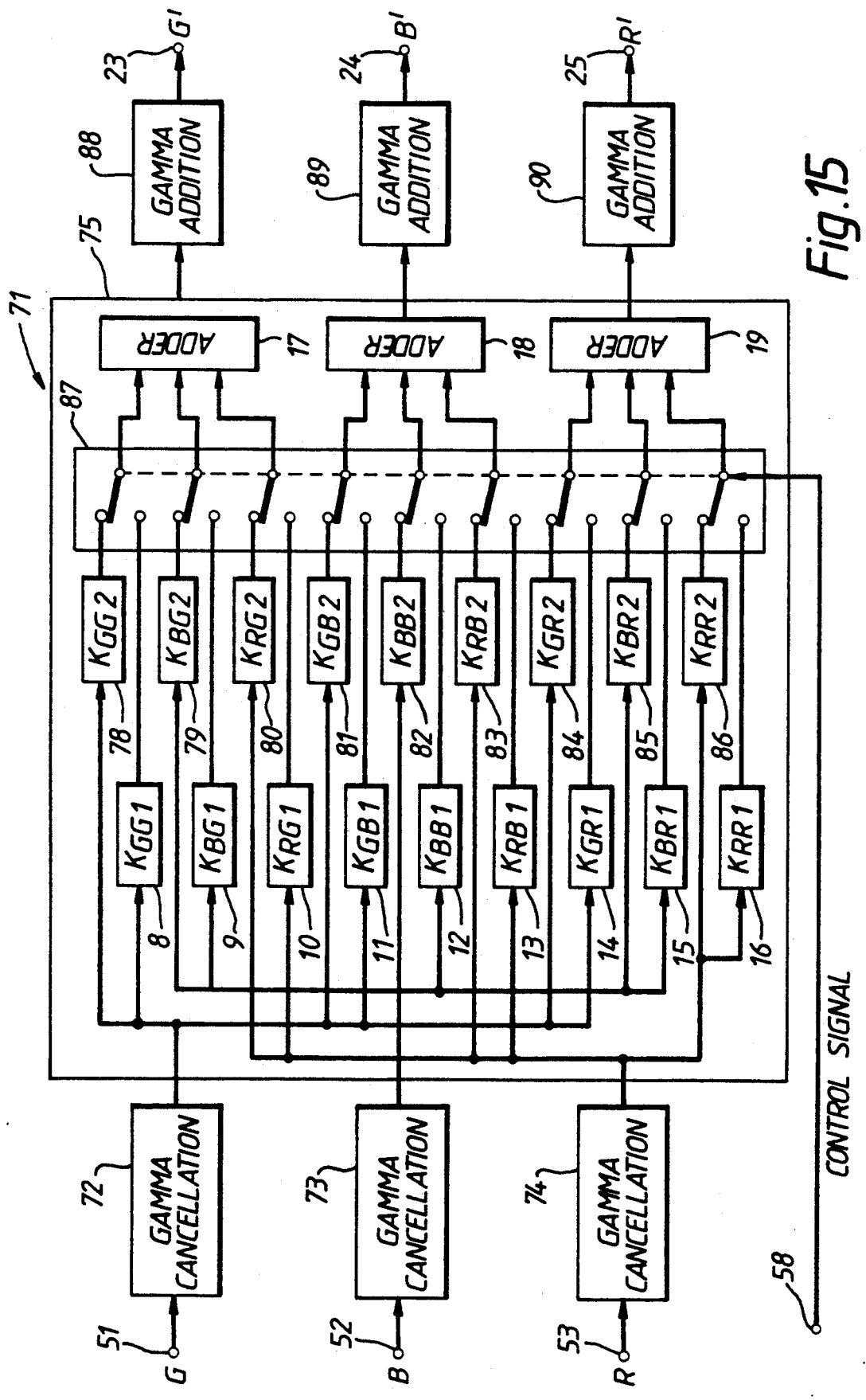
FIG. 15 is a block diagram showing a linear matrix circuit used for another embodiment of the present invention.

FIG. 15 is a block diagram showing a linear matrix circuit used for another embodiment of this invention. In this linear matrix circuit, the gamma cancellation and gamma addition circuits are common for NTSC and HDTV systems. This embodiment differs from the embodiment illustrated in FIG. 12 with respect to linear matrix circuit 71 which is used in place of linear matrix circuits 54 and 55 and switching circuit 56. The G, B and R original signals, which are supplied via input terminals 51, 52 and 53, are supplied to respective gamma cancellation circuits 72, 73 and 74. Gamma cancellation circuits 72, 73 and 74 cancel out the transmission gamma and supply the output signals to coefficient circuits 8 to 16 and 78 to 86 of matrix circuit 75. Coefficient circuits 8 to 16 multiply the supplied R, G and B signals by correction matrix coefficients which correspond to the NTSC system. Coefficient circuits 78 to 86 multiply the supplied R, G and B signals by correction matrix coefficients which correspond to the HDTV system. The control signal indicating the identity of the received broadcast system is supplied to switching circuit 87 from terminal 58. During an NTSC broadcast, switching circuit 87 selects the output signals of coefficient circuits 8 to 16 and supplies these signals to adders 17 to 19.

During an HDTV broadcast, switching circuit 87 selects the output signals of coefficient circuits 78 to 86 and supplies these signals to adders 17 to 19. Adders 17 to 19 add the three supplied signals of each color and provide the signals to respective gamma addition circuits 88, 89 and 90. Gamma addition circuits 88, 89 and 90 add transmission gamma to the respective color signals.

In this embodiment, correction of the original signal is switched according to the particular broadcast system (NTSC or HDTV) the same as described above with respect to the first embodiment of this invention. Also in this embodiment, the size of the circuitry can be reduced by making the gamma cancellation and gamma addition circuits common for both the NTSC and HDTV systems.

Figure 4:
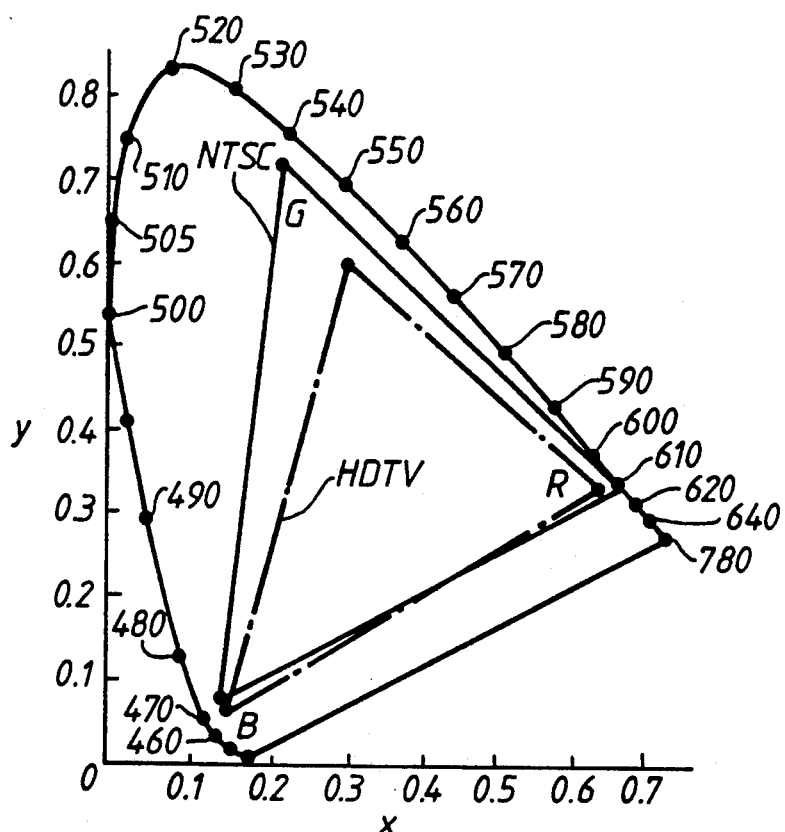
FIGS. 4 and 5 are CIE chromaticity diagrams showing the three primary color chromaticities of an HDTV system and an SMPTE system, respectively.
Figure 5:
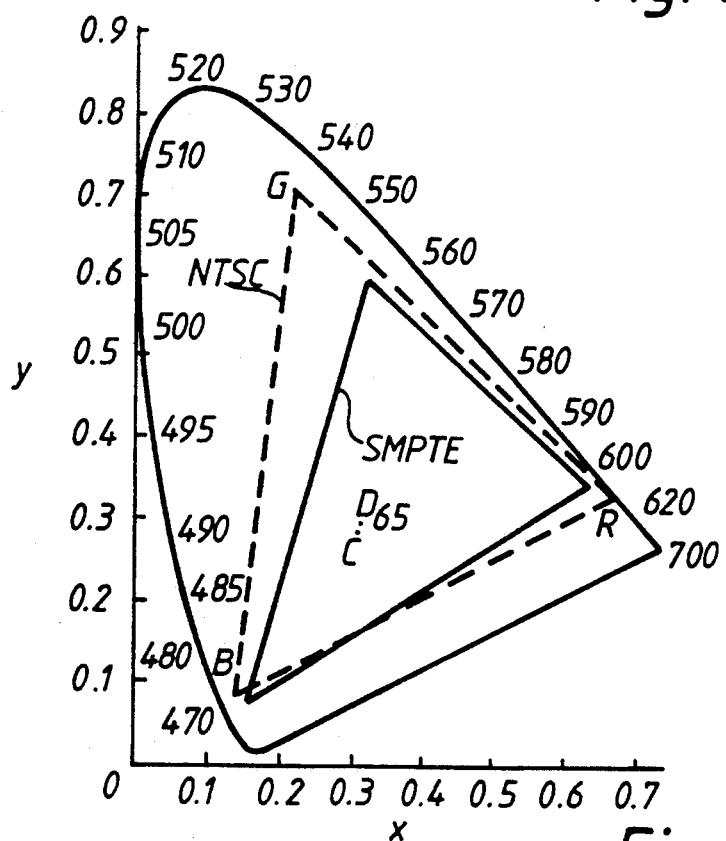
Figure 6:
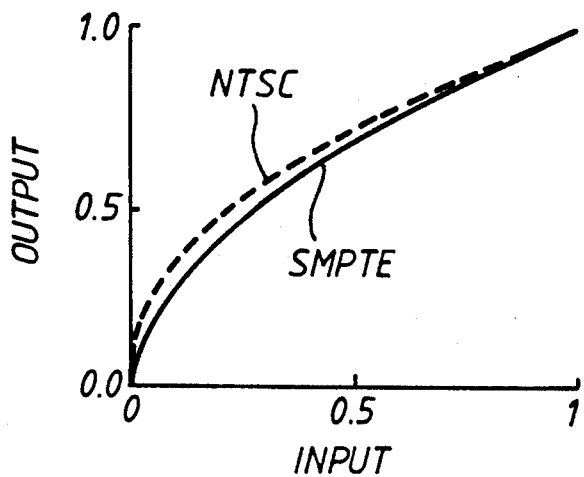
FIG. 6 is a graph showing the gamma curves of an NTSC and SMPTE system.

In the above embodiments, the linear matrix circuits are positioned at the initial stage in the drive circuit as shown in FIG. 12. However, these circuits may be positioned at a later stage as well. Note that the display primary color chromaticities are set by the white lamp and the optical system so that they include the transmission primary color chromaticities of multiple systems, such as NTSC and HDTV. However, the chromaticity ranges of an NTSC system clearly are distinguished from those of other systems but include the other systems as shown in FIGS. 4 and 5. Note, however, that the chromaticity of blue has little influence on visual effects in comparison with other colors as the differences between the chromaticity of blue in the NTSC and HDTV systems is not great. Thus, even when the display primary color chromaticities are set to NTSC values in this embodiment, nearly the same visual effect can be achieved as in the previously discussed embodiments. In this case, the linear matrix circuit for the NTSC system can be omitted, thus reducing the size and cost of the circuitry.

As described above, the present invention provides a display apparatus in which the transmitted colors can be faithfully reproduced, even when receiving television signals from multiple systems with differing transmission specifications and formats. The present invention also includes a display which can provide natural gradation rendering for the various transmission systems.

While the present invention has been illustrated and described in detail in the drawings and foregoing description, it will be recognized that changes and modifications can and will occur to those skilled in the art. It is therefore intended by the appending claims, to cover any such changes and modifications as fall within the true spirit and scope of the invention.

What is claimed:

1. Television receiving apparatus for receiving and displaying television signals distributed in a plurality of formats, said television apparatus comprising:
   input means for receiving said television signal;
   color error correction means coupled to said input means for correcting color reproduction errors associated with the received television signal and providing a corrected television signal;
   display means coupled to said color error correction means for receiving said corrected television signal and displaying a television image in accordance with said corrected television signal, said display means having a reproduction chromaticity range sufficiently wide to include essentially all of the transmission chromaticity range in said received television signal; and
   control means coupled to said color error correction means for controlling the operation of said color error correction means in accordance with the format of said received television signal.

2. Television receiving apparatus as claimed in claim 1, further comprising:
   white color setting means for setting a display white color temperature in said corrected television signal in accordance with the format of said received television signal.

3. Television receiving apparatus as claimed in claim 1, wherein said display means is a projection-type display and includes:
   a lamp for emitting a white light;
   a plurality of optical components for extracting a plurality of colored light beams from said white light;
   a plurality of liquid crystal panels for modulating said colored light beams according to said corrected television signal in order to produce image light beams for displaying said television image; and
   wherein said reproduction chromaticity range is achieved by varying characteristics of said lamp and said optical components.

4. Television receiving apparatus as claimed in claim 1, wherein said color error correction means includes a first linear matrix circuit having a plurality of coefficients selected for a first format of said plurality of formats for correcting said color reproduction errors caused by a difference between said reproduction chromaticity range and said transmission chromaticity range of said first format.

5. Television receiving apparatus as claimed in claim 4, wherein said color error correction means includes a second linear matrix circuit having a plurality of coefficients selected for a second format of said plurality of formats for correcting said color reproduction errors caused by a difference between said reproduction chromaticity range and said transmission chromaticity range of said second format, wherein said first and second linear matrix circuits are controlled by said control means.

6. Television receiving apparatus as claimed in claim 1, further comprising:
   gamma cancellation means for cancelling transmission gamma correction from said received television signal prior to correction by said color error correction means; and
   gamma addition means for adding a predetermined gamma correction independent of the format of said received television signal to said television signal after correction by said color error correction means.

7. Television receiving apparatus for reproducing a colored image transmitted by a television signal in any one of a plurality of systems with differing transmission specifications, said apparatus comprising:
   input means for receiving a television signal;
   detection means coupled to said input means for receiving said television signal and detecting which system of said plurality of systems is used for said television signal and generating a control signal which indicates the system of said television signal;
   color error correction means for correcting color reproduction errors associated with said received television signal in accordance with said control signal and providing a corrected television signal;
   white color setting means for setting a display white color temperature in accordance with said control signal and the system of said television signal; and
   display means having a reproduction chromaticity range wider than the transmission chromaticity ranges of each of the systems of said plurality of systems, said display means displaying a television image in accordance with said corrected television signal and said display white color temperature.

8. Television receiving apparatus as claimed in claim 7, further comprising:
   gamma cancellation means for cancelling transmission gamma correction from said received television signal;
   matrix means having a plurality of coefficients for multiplying said received television signal by said coefficients; and
   gamma addition means for adding a predetermined gamma correction independent of the system of said television signal to said corrected television signal.

9. Television receiving apparatus as claimed in claim 7, wherein said display means is of a projection-type and includes a plurality of optical components and a plurality of liquid crystal panels, wherein said optical components generate a red color beam, a green color beam and a blue color beam, said red, green and blue beams being modulated by said liquid crystal panels in accordance with said corrected television signal.

10. A method for reproducing a color image transmitted by a television signal in any one of a plurality of systems with differing transmission specifications, said method comprising the steps of:
   receiving said television signal and providing a received television signal;

detecting which system of said plurality of systems is used for said television signal and generating a control signal which indicates the system of said television signal;

correcting color reproduction errors associated with the received television signal in accordance with said control signal and providing a corrected television signal; and driving a display device having a reproduction chromaticity range set sufficiently wide to include the transmission chromaticity ranges of said plurality systems in accordance with said corrected television signal and displaying said colored image.

11. A method as claimed in claim 10, wherein the method further comprising the step of:

setting a display white color temperature in said corrected television signal according to said control signal and the system of said television signal.

12. A method as claimed in claim wherein the method further comprising the steps of:

cancelling transmission gamma correction from said received television signal prior to performing said correcting step; and adding a predetermined gamma correction independent of the system of said television signal to said corrected television signal after performing said correcting step.

* * * * *